United States Patent [19]
Carroll et al.

[11] Patent Number: 6,154,205
[45] Date of Patent: Nov. 28, 2000

[54] NAVIGATING WEB-BASED CONTENT IN A TELEVISION-BASED SYSTEM

[75] Inventors: Josh Carroll, Mountain View, Calif.; Sven Pleyer, Redmond; Daniel J. Shoff, Issaquah, both of Wash.

[73] Assignee: Microsoft Corporation, Redmond, Wash.

[21] Appl. No.: 09/048,833

[22] Filed: Mar. 25, 1998

[51] Int. Cl.⁷ ..................................................... G06F 3/00
[52] U.S. Cl. ........................ 345/327; 345/341; 345/973; 345/123
[58] Field of Search ........................... 345/121, 123–125, 345/145, 157, 327, 339, 341, 348, 357, 973; 348/13, 563

[56] References Cited

U.S. PATENT DOCUMENTS

| | | | |
|---|---|---|---|
| 4,803,474 | 2/1989 | Kulp | 345/160 |
| 4,954,818 | 9/1990 | Nakane et al. | 345/340 |
| 4,987,411 | 1/1991 | Ishigami | 345/159 |
| 5,195,179 | 3/1993 | Tokunaga | 395/159 |
| 5,214,414 | 5/1993 | Levine et al. | 345/157 |
| 5,263,134 | 11/1993 | Paal et al. | 345/342 |
| 5,298,890 | 3/1994 | Kanamaru et al. | 345/157 |
| 5,510,811 | 4/1996 | Tobey et al. | 345/157 |
| 5,589,893 | 12/1996 | Gaughan et al. | 348/734 |
| 5,642,131 | 6/1997 | Pekelney et al. | 345/145 |
| 5,682,511 | 10/1997 | Sposato et al. | 395/353 |
| 5,808,608 | 9/1998 | Young et al. | 345/327 |
| 5,874,957 | 2/1999 | Cline et al. | 345/339 |

FOREIGN PATENT DOCUMENTS

| | | |
|---|---|---|
| 0 467 720 A3 | 7/1991 | European Pat. Off. . |
| 0 671 682 A2 | 9/1995 | European Pat. Off. . |
| 0 811 940 A2 | 12/1997 | European Pat. Off. . |
| 890183631 | 7/1989 | Japan . |
| 900093953 | 4/1990 | Japan . |
| 64-186464 | 3/1991 | Japan . |
| 2-314038 | 7/1992 | Japan . |
| 05079887 | 4/1993 | Japan . |
| WO 93/22758 | 11/1993 | WIPO . |

OTHER PUBLICATIONS

K. Reichard et al., "GUI Web Browsers," Jul. 1995, Unix Review, pp. 69–74.

Canon, Inc., "Pointing Cursor Controller," Patent Abstrats of Japan, Pub. No. 06289996, Oct. 1994.

IBM Corp., "Methodology for Making Objects Using a Polar Coordinate Point and Shoot Cursor,", IBM Technical Disclosure Bulletin, vol. 35, No. 6, Nov. 1992.

*Primary Examiner*—Raymond J. Bayerl
*Assistant Examiner*—X. L. Bautista
*Attorney, Agent, or Firm*—Lee & Hayes, PLLC

[57] ABSTRACT

A television-based hyperlink content navigation system includes a display device having a viewing area for displaying visual content such as an Internet Web document. Generally, the visual content has a content area that is larger than the viewing area, and includes a plurality of selectable objects such as hyperlinks and image maps. A user-manipulated operator such as a joystick allows navigation through the various hyperlinks and image maps, and also initiates scrolling of the visual content. Assuming that a focus is initially on a first one of the objects, moving the trackball tabs the focus to a nearby second object if the second object is within a predefined linear distance from the first object. If there is no second object within the predefined distance, moving the trackball causes the visual content to scroll at a speed that is proportional to the trackball speed. If a currently focused object is an image, such as an image map, that has a continuous two-dimensional range of selectable points, moving the trackball moves a pointer over the image in a continuous manner. Such a pointer is displayed only when the focus is on such a continuous image.

43 Claims, 5 Drawing Sheets

NAVIGATING WEB-BASED CONTENT IN A TELEVISION-BASED SYSTEM

TECHNICAL FIELD

This invention relates to systems and methods for navigating through a hypermedia document such as a Web-based document when the document is displayed in a television-based environment rather than a typical computer environment.

BACKGROUND OF THE INVENTION

There is a growing trend to incorporate computer-like functions into television or television-based devices. Internet use is area where this is happening. Internet browsing devices are now available for use with televisions. When using devices such as these, visual and audio Internet content are rendered by the television equipment rather than by dedicated computer peripherals.

In the desktop computer environment, substantial attention has been given to selecting appropriate methods of user interaction. At the moment, the Windows family of operating systems, available from Microsoft Corporation, utilizes what seems to be the most popular user interface.

The Windows operating systems emphasize the use of a mouse in conjunction with an on-screen pointer and a plurality of on-screen objects or controls. The mouse can be moved across a flat surface in different directions to produce a corresponding analog movement of the on-screen pointer. This method of moving a pointer is referred to as "roaming."

Objects or controls, also referred to as icons, represent functions or items that are available for a user to select. To select an object, the user moves the pointer over the object and depresses or "clicks" a button on the mouse. The operating system responds by performing an appropriate action, depending on the nature of the selected object.

Although this type of user interface works well in the desktop environment, it is not nearly as effective when transferred to the television environment. In the television environment, the user is typically sitting on a couch or recliner at some distance from the image displayed by the television. As a further complication, most televisions have much lower display resolutions than typical computer monitors. These factors make it somewhat more difficult to display and position objects and mouse pointers. Additionally, the user's viewing situation often does not lend itself to the use of a mouse. Rather, the user is often more comfortable with an IR (infrared) control with more rudimentary controls such as a set of orthogonal direction keys. Finally, apart from physical constraints, positioning an on-screen pointer simply requires more concentration that a casual user is willing to put forth during a time intended for relaxation or recreation.

As a result of these factors, many television-related products now use a so-called "tabbing" navigation model. This model constrains the user's movement to a limited set of displayed objects. Rather than using a pointer, a "focus" is moved around the display between different objects. The focus is generally indicated by highlighting or otherwise changing the appearance of the focused object. Generally, one and only one item has the focus at any given time. To select an object, the user moves the focus from object to object using directional keys or some other type of directional control operators. As opposed to the roaming model discussed above, the focus "tabs," "jumps," or moves abruptly from one object to the next. When the focus is on the desired object, the user pushes an "action" key to select the object.

This navigational model has disadvantages. For example, modem interfaces and information content often demand the ability to select arbitrary points on a display. This is not possible with the tabbing navigational model. Furthermore, while tabbing is helpful for novice users, such users quickly become more sophisticated. To sophisticated users, tabbing is often a constraint rather than a help.

Another problem arises when information content, such as Internet content, is scrollable over a displayed area. In this situation, it is desirable for the directional control keys to also initiate scrolling at appropriate times. This can be accomplished by automatically scrolling the content so that the next focused object is on-screen. However, this often results in an annoying lack of continuity and in unintended focus movement, especially when focusable objects are far from each other in the information content. For this reason, most popular user interfaces utilize two different methods or input sequences for focus movement and scrolling, respectively.

SUMMARY OF THE INVENTION

The invention utilizes a directional navigation operator such as a trackball or joystick on a remote control device. The trackball is used in conjunction with a navigational model that allows tabbing, roaming, and scrolling, all under the control of the trackball. Most basically, the navigational model performs tabbing by default whenever there is a focusable object within fairly close proximity to the currently focused object. When tabbing, scrolling is automatically performed, if necessary, to bring the next focused object into view. If there is no nearby object, however, the navigational model responds to user input by simply scrolling the information content in the direction indicated by the trackball or joystick movement, without tabbing the focus.

In addition, the navigational model detects when a focused object is an object such as an image map that calls for roaming-type navigation. If this is the case, an on-screen pointer is generated and moved smoothly over the image map in response to trackball movement. When the user moves the pointer away from the image map, tabbing or scrolling is performed in accordance with the technique already mentioned.

A user can initiate scrolling in two other ways. First, the user can move the trackball very slowly to "nudge" the content in one direction or another without tabbing to an adjacent control. Second, the user can move the trackball very quickly. Moving the trackball quickly results in "free scrolling," during which the focus is suspended. At the end of free scrolling, the focus locks onto a visible object if one is available in the viewed area.

DETAILED DESCRIPTION

Internet Content

The World Wide Web (WWW or Web) of the Internet is a body of multimedia content referred to as "hypermedia." "Hypermedia" is a metaphor for information in which text, images, sounds, and actions are linked together in a complex, non-sequential web of associations that permit a user to "browse" or "navigate" through related topics, regardless of the presented order of the topics. The term "hypermedia" arises from "hypertext," a term which was originally coined to describe text-based documents including links to other such documents to form a non-sequential web of associated ideas.

Hypermedia content is commonly organized as individual "documents" or "pages" with embedded control information. A document or page normally corresponds to a single file that is retrievable either locally or through a network. The embedded control information includes formatting specifications, indicating how a document is to be rendered. In addition, such control information can include links or "hyperlinks": symbols or instructions indicating where to find other related Web documents (files) on the Internet. A hyperlink from one hypermedia topic to another is normally established by the author of a hypermedia document, although some applications allow users to insert hyperlinks to desired topics.

An application program referred to as a Web browser is used to retrieve and render hypermedia content from the WWW. A Web browser allows a user to browse or navigate through the Web and to thereby find items of specific interest to the user. The terms "browse" and "navigate" indicate a process of following a sequence of hyperlinks through a plurality of different documents or other Web resources.

In response to activation or selection of a particular hyperlink, a Web browser loads and renders the file or other multimedia content specified by the hyperlink. In accordance with conventional practice, such content typically contains hyperlinks to additional media resources (thus creating the "web" of inter-linked documents or resources). A user can select any such hyperlink and in response the viewing software will load the media resources identified by that hyperlink.

A hyperlink is typically rendered by a Web browser as a graphical icon or as highlighted keywords. A user "activates" or "follows" a hyperlink by clicking on or otherwise selecting the icon or highlighted keywords. Activating a link causes the Web browser to retrieve and render the document or resource that is targeted by the hyperlink. The target of the hyperlink is specified in the document containing the hyperlink.

In concept, the target of a hyperlink can be virtually any type of object—including executable programs, text or multimedia documents, sound clips, audio segments, still images, computers, directories, and other hyperlinks. In WWW documents, hyperlink targets are most often files that can reside on any computers connected to the Internet. However, a hyperlink target can also be a particular location within a document, including the document that is currently being rendered.

The invention described herein relates to displaying and navigating through a single hyperlinked document or page. In this context, a document or page is defined as visual content having a two-dimensional content area of a particular size. The size of each document can be different and is often larger than the available viewing area. Thus, content scrolling is performed in response to user input. Scrolling consists of moving the visual document relative to the smaller viewing area to bring different parts of the document into view.

In addition to scrolling, a user needs to be able to select different hyperlinks other objects that form part of the document. As will be described in more detail below, the described embodiment of the invention utilizes a single user input operator such as a trackball for both scrolling and for moving a focus or cursor to different selectable objects.

Hardware Environment

The invention is described in the environment of a television-based computer with Internet connectivity that has come to be referred to generically as a "Web television" or an "Internet television." Devices such as this can be constructed in a variety of configurations, such as standalone TVs, as system or set-top boxes that are to be used in conjunction with TVs, or as more traditional computers with television viewing capabilities. These devices combine the network browsing functions of a computer with the television viewing capabilities of traditional televisions. In addition, so-called Internet televisions provide enhanced functionality like interactive programming guides and the linking of hyperlinked Web content to television content.

Figure 1:
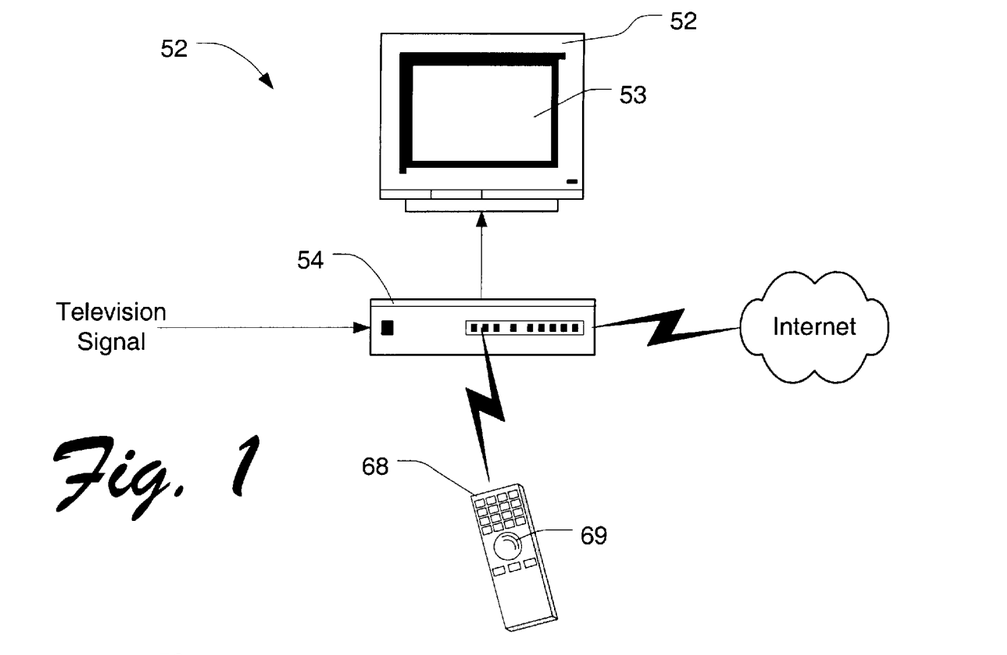
FIG. 1 illustrates a television-based system that incorporates Web browsing features.

FIG. 1 shows one example of television-based computer or browser system 50 within which implements a television-based hyperlink content navigation system. In this example, the system comprises a conventional television receiver 52 and a system or set-top box 54. Television receiver or display 52 has a viewing area 53 of a finite two-dimensional size, and is connected to receive a video/audio signal from system box 54. A remote control device 69 is connected to an input port of system box 54, preferably by way of a wireless infrared connection. The system box has a connection to the Internet and receives a television signal from a terrestrial source, from a satellite, or from a cable television system.

The remote control device has a user-manipulated operator 69 that can be manipulated by a user in different directions. Preferably, the operator is infinitely variable in terms of both direction and amount. The term "amount" is used to indicate the degree to which the operator is activated. This might correspond to the distance or rotation angle through which an operator is moved, the speed at which it is moved, the force with which it is activated, the length of time it remains activated, or some other measurement that can be associated with speed or distance.

A trackball (also referred to as a rollerball or a thumb-ball) is a preferred example of a user-manipulated operator. A trackball can be rotated in any angular direction and is also variable in terms of the speed at which it is rotated. The direction of rotation is understood to be perpendicular to the axis about which the trackball is rotated.

A force-activated pointing device is another example of an operator that can work effectively in conjunction with the invention. Such devices are commonly used on laptop computer keyboards. They can be pressed in any angular direction and are also variable in terms of the force with which they are pressed. The degree of force used to press the device is usually associated with a desired speed.

A conventional joystick could also be used, as could certain types of keys or buttons. A conventional computer mouse could also be used, although it is not as convenient in the television environment. Other types of input devices could also be used.

Figure 2:
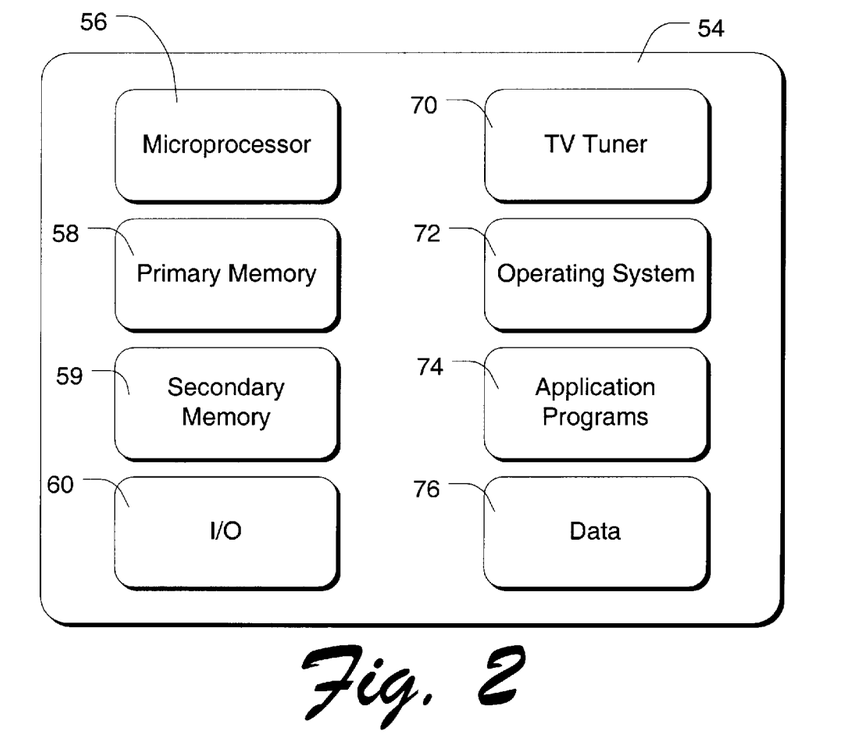
FIG. 2 is a block diagram of a system box in accordance with the invention.

FIG. 2 shows the most pertinent components of system box 54. System box 54 is essentially a computer, having a data processor or microprocessor 56, primary memory including volatile and non-volatile memory 58, optional secondary memory 59 such as a hard disk, floppy disk, or other removable media, various I/O components 60, and other components as are common in personal computers. The pertinent I/O components include a remote control input port, a video/audio output port, a network interface, and a television signal input port. The network interface connects to a private or public network such as the Internet. The network interface might comprise a telephone-line modem, an Ethernet interface, or some analogous interface. System box 54 also has a television tuner 70 for receiving and demodulating traditional television signals.

Software

The microprocessor of system box 54 is programmed by means of programs and instructions stored at different times in the different computerreadable storage media of the system box. Programs are typically distributed, for example, on floppy disks or CD-ROMs. From there, they are installed or loaded into the secondary memory of a computer. At execution, they are loaded at least partially into the computer's primary electronic memory. The invention described herein includes these various types of computer-readable storage media when such media contain instructions or programs for implementing the described steps in conjunction with a microprocessor or other data processor. The invention also includes the system or computer itself when programmed according to the methods and techniques described below.

In the specific embodiment described, programs are stored in and execute directly from non-volatile ROM.

As shown in FIG. 2, the system includes an operating system 72, one or more application programs 74, and program data 76. For purposes of illustration, programs, program components, and data are shown in FIG. 2 as discrete blocks within system box 54, although it is recognized that such programs and components reside at various times in different storage components of the computer-based system.

The operating system is preferably a multitasking operating system such as the Windows CE operating system sold by Microsoft Corporation. The operating system employs a graphical user interface in a windowing environment.

In this example application program 74 is an Internet Web browser having traditional browsing capabilities. Browser 74 allows a user to browse or navigate through the World Wide Web of the Internet or any similar resources. Particular Web resources can be specified by a user by direct entry or by selecting a hyperlink, by other application programs through standard program interfaces, or by scripts contained in Web content itself.

The Web browser displays Web documents in a defined rectangular window on display 52. In some cases, the window will correspond to the viewing area 53 of the display. In other cases, the window will be smaller, thereby reducing the effective viewing area for Web documents. The viewing area is alternatively referred to herein as the browser window.

Navigational Methods

Figure 3:
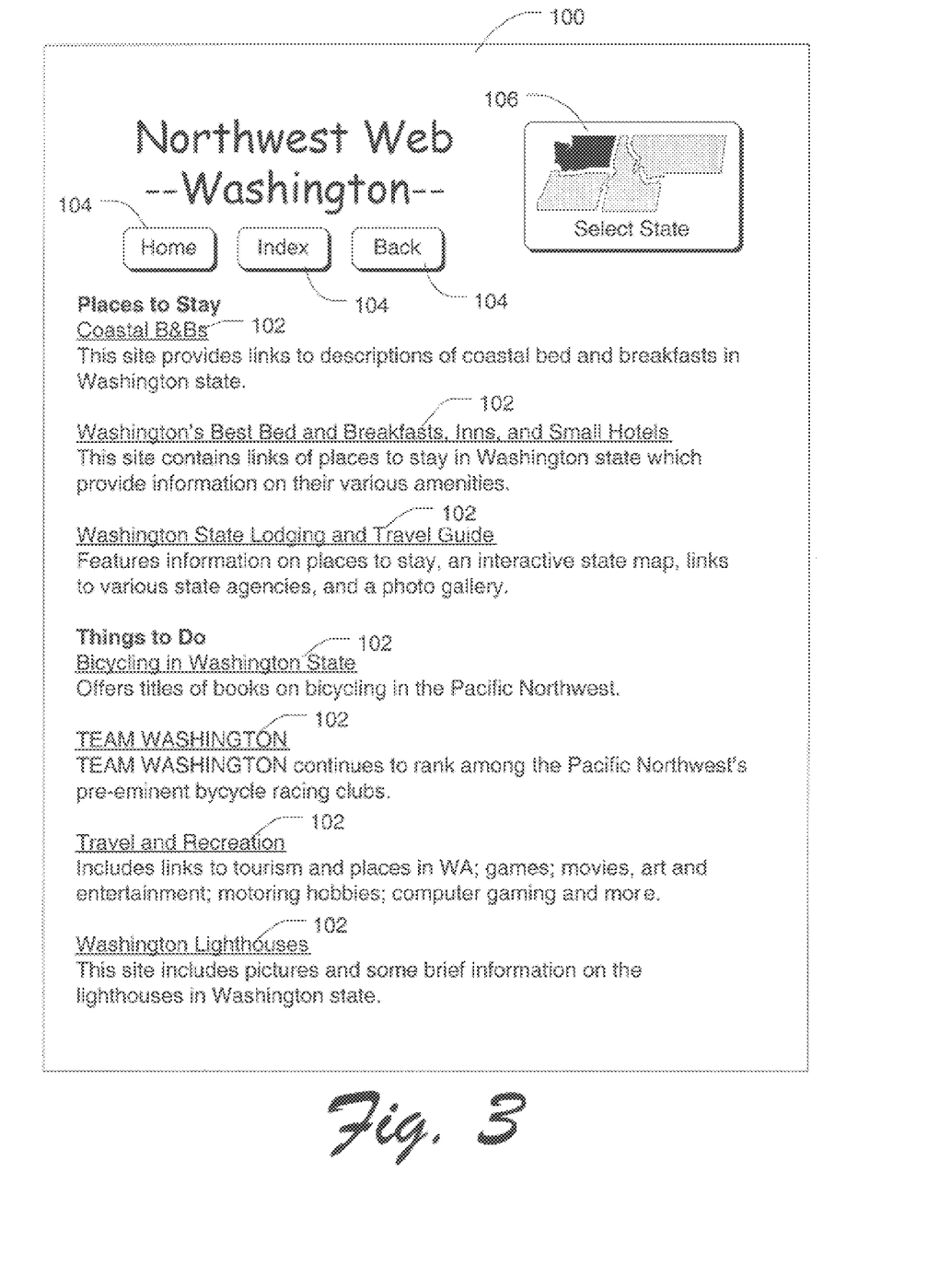
FIG. 3 shows an example of hyperlinked Web content for use in conjunction with the invention.

FIG. 3 shows an example of a Web document 100. It is comprised primarily of text. Some portions of the text form hyperlinks 102. In this example, textual hyperlinks are indicated by underlining.

The Web document also includes visual graphics elements. Some of these are discrete elements 104 that are loosely referred to as "buttons." A button can also form a hyperlink, and is selectable in the same way as a textual hyperlink.

One of the graphics elements, referenced by numeral 106, is a so-called "image map". An image map is an image having a continuous two-dimensional range of selectable points. A user can select any point and its coordinates are sent to a Web server. The server then returns content that is chosen based on the particular point selected. In the example, the image map is an actual geographical map of several states, and the server returns information relating to the particular geographical area selected by a user. Although the example image map shows a geographical map, this is not always the case. Image maps can be utilized for a variety of different purposes. Another example is an image showing products of a product family, allowing the user select a particular product based on its image in the image map.

The image map discussed herein is referred to as a "server-side" image map since it relies on a server for interpretation of the chosen two-dimensional coordinates. "Client-side" image maps are also available in Web content. With a client-side image map, the document containing the image contains coordinate definitions of image areas associated with particular hyperlink targets.

For purposes of this description, textual hyperlinks 102, graphical hyperlinks 104, and image map 106 are referred to as selectable objects. In the case of a server-side image map, the map as a whole is considered a single selectable object. In the case of a client-side image map, each defined image area is dealt with as a distinct object. Hyperlinked content can also contain other selectable objects.

Figure 4:
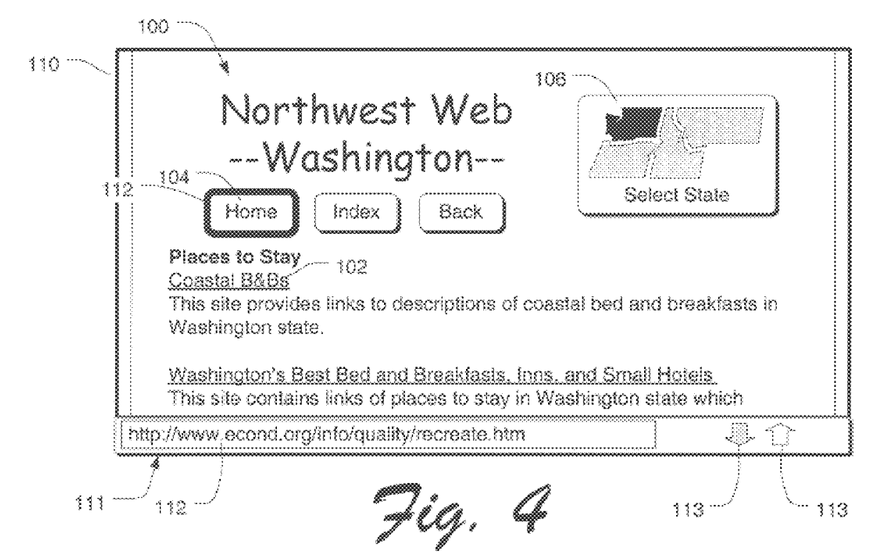
FIG. 4 shows a browser window and illustrates a focus in conjunction with a discrete graphical element.

FIG. 4 shows Web document 100 relative to the viewable area 110 of a Web browser, also referred to as the browser window. Only a small portion of the visual content of Web document 100 is visible at any given time in the browser window, since the browser window is smaller than the area of the Web document. Thus, scrolling is necessary to view different parts of the content.

A status area 111 is appended to the bottom of the browser window. A description area 112 within the status area shows either the current URL of the viewed document, or optional text that is specified from within the document. Scroll indicators 113 indicate to the user whether scrolling is possible in vertical directions.

FIG. 4 also shows a focus 112 that is initially placed on a first one of the selectable objects within viewable area 110. The focus is a visual construct that indicates which of the selectable objects will be activated if the user presses an "activate" or "enter" key. Navigation among various hyperlinks and other selectable objects is performed by moving the focus from one object to another.

In the describe example, the focus is indicated differently depending on whether it is on a textual object or a graphical object. In FIG. 4, the focus is on a graphical element 104. In this case, a highlighted border is placed around the object to indicate that the graphical object is the subject of the focus.

Figure 5:
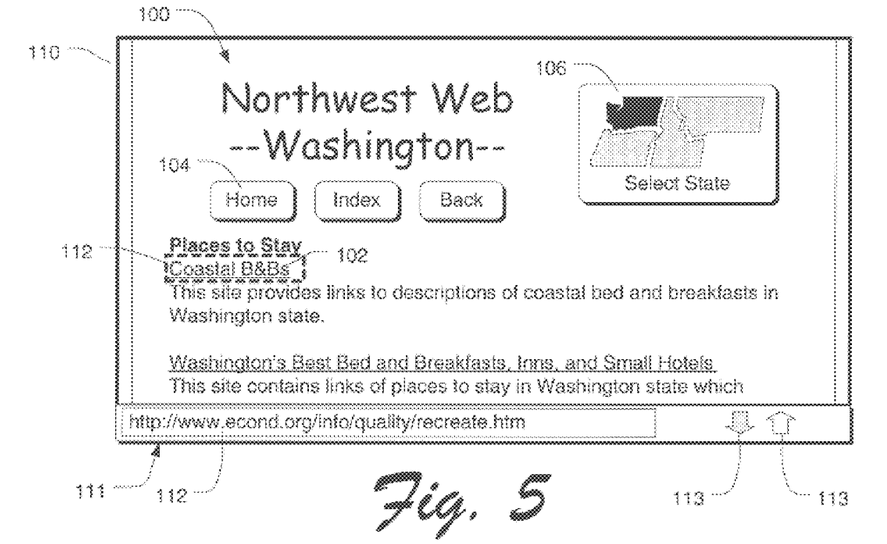
FIG. 5 shows a browser window and illustrates a focus in conjunction with a textual hyperlink.
Figure 6:
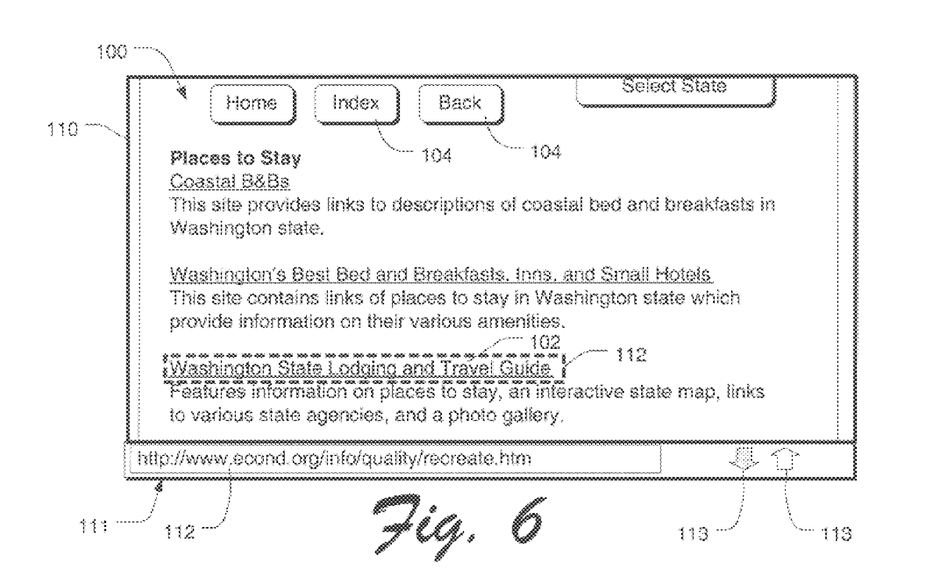
FIG. 6 illustrates automatic scrolling in accordance with the invention.

FIG. 5 illustrates focus 112 when it is on a textual object 102. In this case, the focus is indicated by a dashed and perhaps blinking box around the hyperlink text, perhaps in a different color. In practice, the focus might be indicated by changing the color of the focused text, by blinking the text, or by some other method that distinguishes the text from its surrounding graphical elements.

The objectives of the navigational model described herein are to allow a user to (a) tab between selectable objects; (b) scroll the document image in a convenient manner; and (c) move a cursor or pointer continuously though server-side image maps to select desired coordinates. These objectives are accomplished as follows.

The navigation system of the browser is responsive to activation of the trackball in a selected direction. In response to the activation, the system determines the direction of the activation and a speed measurement derived from the amount or degree of the activation.

Assuming that the focus initially rests on a first object, the system then determines whether there is a second object within a predefined linear distance of the first object in the direction of trackball activation. The second object does not have to be in the viewable area to be considered in this step. Rather, it can be anywhere (within the predefined linear distance) within the content area of the Web document. If the result of this determination is true, the system performs a step of tabbing the focus to the second object. The system also automatically scrolls the visual content relative to the browser window if necessary to bring the second object into the browser window.

As used herein, the term "tabbing" means to move a focus abruptly from one control to another.

When using a device such as a trackball, a mouse, or a joystick, which allow infinitely variable directional control, there can be a degree of ambiguity regarding the user's intentions when moving the trackball. Specifically, any error in the directional movement initiated by the user can result in unexpected movement of the focus. Furthermore, there might be a plurality of controls in the approximate direction selected by the user.

There are various methods of resolving such ambiguity. One preferred method is described in a U.S. Patent application filed by Microsoft Corporation on Mar. 10,1994, entitled *"Apparatus and Method for Automatically Positioning a Cursor On a Control,"* having U.S. Ser. No. 08/209, 166, which is hereby incorporated by reference. In accordance with the invention described herein, however, only those objects within the predefined linear distance are considered as candidates for tabbing.

In addition to the methods described in the cited patent application, the described embodiment of the invention attempts to detect special cases that might require special handling. For instance, the system attempts to determine whether nearby objects are part of a list. A list can be identified as a series of textual hyperlinks having a regular vertical spacing. If a series of hyperlinks are found to form a list, they are grouped for purposes of determining the object to which the user intended to tab, and care is taken so that any tabbing moves to the first (in the case of downward tabbing) or last (in the case of upward tabbing) of the list rather than to some intermediate element within the list.

If there is not a second one of the objects within the predefined linear distance in approximately the selected direction (as determined by the methods disclosed in the U.S. patent application cited above), the system scrolls the Web document relative to the viewable area, without moving the focus. If the focused object eventually leaves the viewable area as a result of this scrolling, the focus is simply removed. If, as a result of scrolling, another selectable object enters the viewable area, that object becomes the subject of the focus.

The tabbing behavior described above can be overridden in two ways. First, tabbing is performed only if the speed value (derived from the speed measurement of the trackball or other user-manipulated operator) exceeds a predefined minimum threshold. If the trackball is rotated at a slower speed, the content is scrolled very slowly in the direction of trackball movement, without tabbing the focus. Second, focus tabbing is performed only if the speed value does not exceed a predefined maximum threshold. If the trackball is rotated at a higher speed than the maximum threshold, the content is scrolled at a speed proportional to the trackball speed, in the direction opposite to the rotation of the trackball.

In addition to the tracking and scrolling mentioned above, the system changes to a roaming behavior if the currently focused object is a server-side image map. When the focus moves to such an object, a cursor or pointer is displayed in the middle of the map. The focus remains visible on the selected object. The pointer then moves smoothly over the image map in response to further directional activation of the trackball. Varying the direction and degree of trackball rotation varies the direction and speed of pointer movement as in conventional roaming models. When the pointer moves off the edge of the image map, the system reverts to the tabbing and scrolling behavior—the pointer is removed and tabbing or scrolling occurs depending on the proximity of other objects in the visual content, as already described above.

Figure 7:
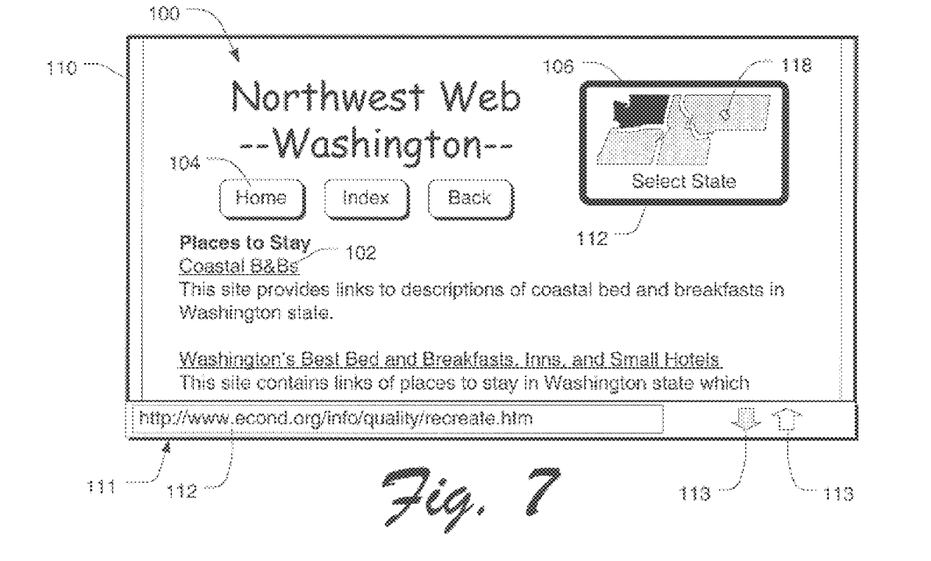
FIG. 7 illustrates the use of roaming in conjunction with an image map.

FIG. 7 shows an example of this roaming behavior, wherein image map 106 is focused and a pointer 118 is displayed over the image map. Note that the pointer appears only when the focus is on an image map such as this, where the user needs to select coordinates from a continuously range of coordinates.

Figure 8:
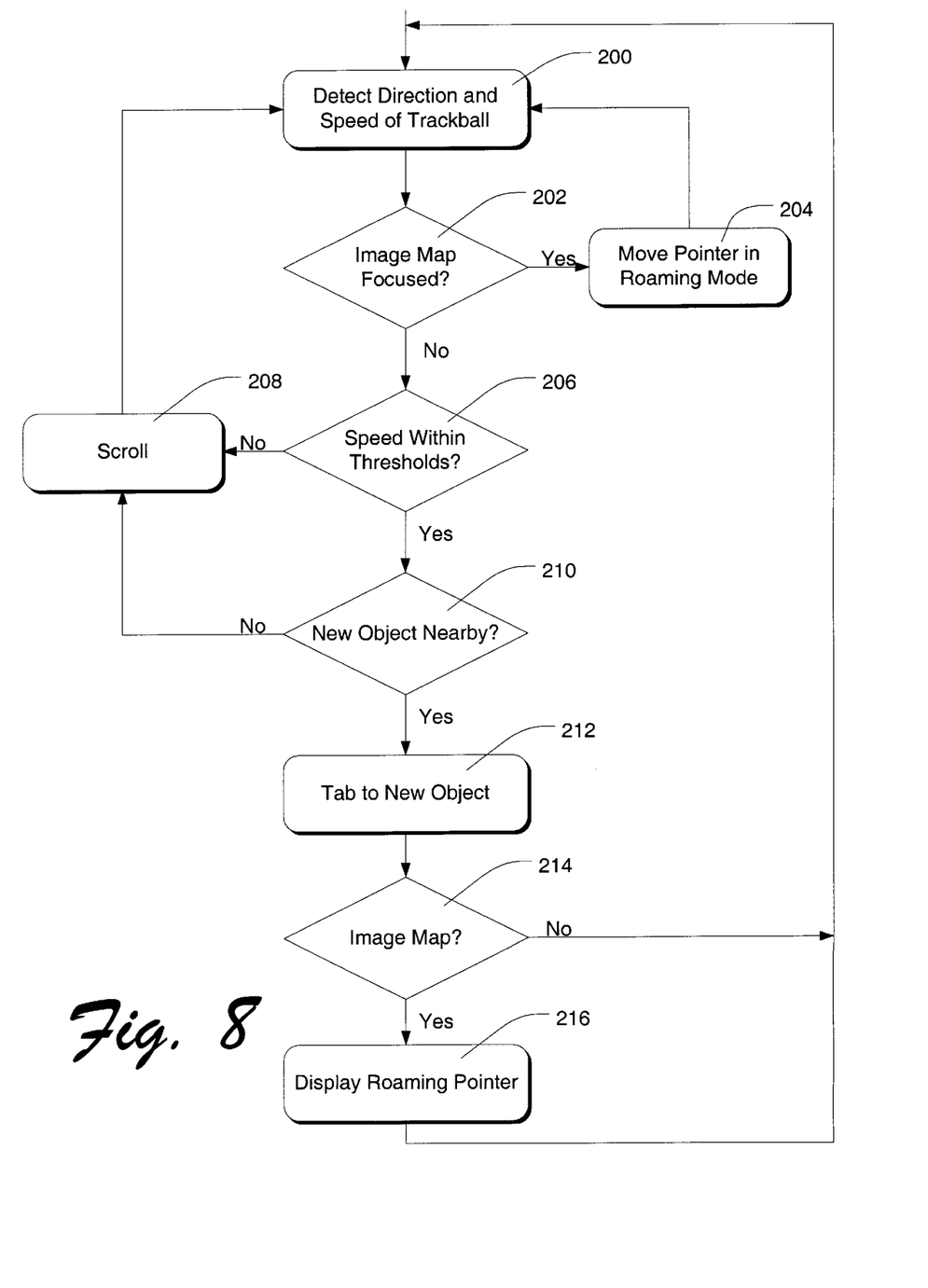
FIG. 8 is a flowchart illustrating preferred steps in accordance with the invention.

FIG. 8 illustrates preferred steps in the form of a flowchart. A step 200 comprises determining the direction and speed of trackball movement. A decision step 202 comprises determining whether the focus is currently on an image map. If it is, a step 204 is performed of moving the pointer in the roaming mode, whereupon step 200 is repeated. If the focus is not on an image map, a step 206 is performed of determining whether the speed of the trackball is within the minimum and maximum speed thresholds. If it is not, a scrolling step 208 is performed at a speed proportional to the speed of the trackball rotation. If the speed is within the thresholds, a step 210 is performed of determining whether there is a new object within the predefined distance from the object that is currently focused, in the approximate direction of the trackball movement. If there is not such an object, scrolling step 210 is perform. If there is a nearby object, a step 212 is performed of tabbing to that object.

Once the focus has been moved to a new object, a step 214 is performed of determining whether the object is an image map. If it is, a step 216 is performed of displaying a roaming pointer within the image map. Otherwise, execution starts again at step 200.

Conclusion

The invention provides an effective mechanism for navigating through the varied content of typical Web pages. In cases where selectable objects are scarce, trackball movement allows smooth scrolling through non-selectable materials such as text. When there are many selectable objects, on the other hand, the trackball allows easy tabbing through such objects. When a roaming model is required, such as with image maps, the same trackball movement is used to move a roaming pointer. Thus, the user uses the same operator for all types of navigation through a Web document.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A television-based hyperlink content navigation system, comprising:
   a viewing area for displaying visual content, wherein the visual content has a content area that is larger than the viewing area;
   a plurality of selectable objects in the visual content;
   a focus that is initially on a first one of the objects;
   a user-manipulated operator that can be manipulated by a user in different directions;
   wherein the navigation system is responsive to activation of the user-manipulated operator in a selected direction to perform steps comprising:
   determining a speed value from the activation of the user-manipulated operator;
   if there is a second one of the objects within a predefined linear distance in the content area from the first object in approximately the selected direction and the speed value exceeds a first threshold, tabbing the focus to said second object and scrolling the visual content relative to the viewing area if necessary to bring the second one of the objects onto the viewing area;
   if there is not a second one of the objects within the predefined linear distance in the content area from the first object in approximately the selected direction and the speed value does not exceed the first threshold, scrolling the visual content relative to the viewing area;
   if the second one of the objects includes a continuous image having a continuous two-dimensional range of selectable points, displaying a pointer over the continuous image and moving the pointer smoothly over the continuous image in response to further directional activation of the user-manipulated operator.

2. A television-based hyperlink content navigation system as recited in claim 1, wherein the navigation system removes the focus during the scrolling step.

3. A television-based hyperlink content navigation system, comprising:
   a viewing area for displaying visual content, wherein the visual content has a content area that is larger than the viewing area;
   a plurality of selectable objects in the visual content;
   a focus that is initially on a first one of the objects;
   a user-manipulated operator that can be manipulated by a user in different directions;
   wherein the navigation system is responsive to activation of the user-manipulated operator in a selected direction to perform steps comprising:
   determining a speed value from the activation of the user-manipulated operator;
   if there is a second one of the objects within a predefined linear distance in the content area from the first object in approximately the selected direction and the speed value does not exceed a threshold, tabbing the focus to said second object and scrolling the visual content relative to the viewing area if necessary to bring the second one of the objects onto the viewing area;
   if there is not a second one of the objects within the predefined linear distance in the content area from the first object in approximately the selected direction and the speed value exceeds the threshold, scrolling the visual content relative to the viewing area;
   if the second one of the objects includes a continuous image having a continuous two-dimensional range of selectable points, displaying a pointer over the continuous image and moving the pointer smoothly over the continuous image in response to further directional activation of the user-manipulated operator.

4. A television-based hyperlink content navigation system as recited in claim 1, the navigation system performing further steps comprising:
   performing the tabbing step only if the speed value does not exceed a second threshold;
   if the speed value does not exceed the first threshold or does exceed the second threshold, scrolling the visual content relative to the viewing area without tabbing to consecutive objects.

5. A television-based hyperlink content navigation system as recited in claim 1, wherein the user-manipulated operator comprises a trackball.

6. A television-based hyperlink content navigation system as recited in claim 1, wherein the selectable objects include hypertext links.

7. A television-based hyperlink content navigation system as recited in claim 1, the navigation system performing a further step of displaying scroll indicators showing whether scrolling is possible in vertical directions.

8. A television-based hyperlink content navigation system as recited in claim 1, the navigation system performing a further step of indicating to the user whether scrolling is possible in vertical directions.

9. A method of navigating visual content in response to activation of a user-manipulated operator in a selected direction, wherein the visual content is displayed on a viewing area, the visual content has a content area that is larger than the viewing area, the visual content includes a plurality of selectable objects, and a first one of the objects is initially the subject of a focus, the method comprising the following steps:
   determining a speed value from the activation of the user-manipulated operator;
   if there is a second one of the objects within a predefined linear distance in the content area from the first object in approximately the selected direction and the speed value exceeds a first threshold, tabbing the focus to said second object;
   if there is not a second one of the objects within the predefined linear distance in the content area from the first object in approximately the selected direction and the speed value does not exceed the first threshold, scrolling the visual content relative to the viewing area.

10. A method as recited in claim 9, wherein the tabbing step includes a step of scrolling the visual content relative to the viewing area if necessary to bring the second one of the objects onto the viewing area.

11. A method as recited in claim 9, comprising a further step of removing the focus during the scrolling step.

12. A method as recited in claim 9, wherein the second one of the objects includes a continuous image having a plurality of selectable areas, the method further comprising:

displaying a pointer over the continuous image;

moving the pointer smoothly over the continuous image in response to directional activation of the user-manipulated operator.

13. A method as recited in claim 9, wherein the second one of the objects includes a continuous image having a plurality of selectable areas, the method further comprising:

displaying a pointer over the continuous image;

moving the pointer smoothly over the continuous image in response to directional activation of the user-manipulated operator;

when the pointer moves off of the continuous image, removing the pointer and either tabbing the focus or scrolling the visual content depending on the proximity of other objects in the content area.

14. A method of navigating visual content in response to activation of a user-manipulated operator in a selected direction, wherein the visual content is displayed on a viewing area, the visual content has a content area that is larger than the viewing area, the visual content includes a plurality of selectable objects, and a first one of the objects is initially the subject of a focus, the method comprising the following steps:

determining a speed value from the activation of the user-manipulated operator;

if there is a second one of the objects within a predefined linear distance in the content area from the first object in approximately the selected direction and the speed value does not exceeds a threshold, tabbing the focus to said second object;

if there is not a second one of the objects within the predefined linear distance in the content area from the first object in approximately the selected direction and the speed value exceeds the threshold, scrolling the visual content relative to the viewing area.

15. A method as recited in claim 9, further comprising:

performing the tabbing step only if the speed value does not exceed a second threshold;

if the speed value does exceed the second threshold, scrolling the visual content relative to the viewing area without tabbing to consecutive objects.

16. A method as recited in claim 9, wherein the user-manipulated operator is a trackball.

17. A method as recited in claim 9, wherein the selectable objects include hypertext links.

18. A method as recited in claim 9, further comprising a step of displaying scroll indicators showing whether scrolling is possible in vertical directions.

19. A method as recited in claim 9, further comprising a step of indicating to the user whether scrolling is possible in vertical directions.

20. A computer-readable storage medium containing instructions that are executable by a computer to perform the steps comprising the steps of claim 9.

21. A hyperlink content browser configured to navigate visual content by performing steps comprising the steps of claim 9.

22. A user interface for navigating visual content, comprising:

a viewing area for displaying the visual content, wherein the visual content has a content area that is larger than the viewing area;

a plurality of selectable objects displayed in the visual content;

a focus that is initially on a first one of the objects;

wherein the user interface is responsive to activation of a user-manipulated operator in a selected direction to perform steps comprising:

determining a speed value from the activation of the user-manipulated operator;

if there is a second one of the objects within a predefined linear distance in the content area from the first object in approximately the selected direction and the speed value exceeds a first threshold, tabbing the focus to said second object;

if there is not a second one of the objects within the predefined linear distance in the content area from the first object in approximately the selected direction and the speed value does not exceed the first threshold, scrolling the visual content relative to the viewing area.

23. A user interface as recited in claim 22, wherein the tabbing step includes a step of scrolling the visual content relative to the viewing area if necessary to bring the second one of the objects onto the viewing area.

24. A user interface as recited in claim 22, wherein the user interface removes the focus during the scrolling step.

25. A user interface as recited in claim 22, wherein the second one of the objects includes a continuous image having a plurality of selectable areas, the user interface performing further steps after tabbing the focus to the second object, said steps comprising:

displaying a pointer over the continuous image;

moving the pointer smoothly over the continuous image in response to directional activation of the user-manipulated operator.

26. A user interface as recited in claim 22, wherein the second one of the objects includes a continuous image having a plurality of selectable areas, the user interface performing further steps after tabbing the focus to the second object, said steps comprising:

displaying a pointer over the continuous image;

moving the pointer smoothly over the continuous image in response to directional activation of the user-manipulated operator;

when the pointer moves off of the continuous image, removing the pointer and either tabbing the focus or scrolling the visual content depending on the proximity of other objects in the content area.

27. A user interface as recited in claim 22, the user interface performing further steps comprising:

determining a speed value from the activation of the user-manipulated operator;

performing the tabbing step only if the speed value exceeds a threshold;

if the speed value does not exceed the threshold, scrolling the visual content relative to the viewing area.

28. A user interface for navigating visual content, comprising:

a viewing area for displaying the visual content, wherein the visual content has a content area that is larger than the viewing area;

a plurality of selectable objects displayed in the visual content;

a focus that is initially on a first one of the objects;

wherein the user interface is responsive to activation of a user-manipulated operator in a selected direction to perform steps comprising:

determining a speed value from the activation of the user-manipulated operator;

if there is a second one of the objects within a predefined linear distance in the content area from the first object in approximately the selected direction and the speed value does not exceed a threshold, tabbing the focus to said second object;

if there is not a second one of the objects within the predefined linear distance in the content area from the first object in approximately the selected direction and the speed value exceeds the threshold, scrolling the visual content relative to the viewing area.

29. A user interface as recited in claim 22, the user interface performing further steps comprising:

performing the tabbing step only if the speed value does not exceed a second threshold;

if the speed value does not exceed the first threshold or does exceed the second threshold, scrolling the visual content relative to the viewing area without tabbing to consecutive objects.

30. A user interface as recited in claim 22, wherein the selectable objects include hypertext links.

31. A user interface as recited in claim 22, the user interface performing a further step comprising displaying scroll indicators showing whether scrolling is possible in vertical directions.

32. A use interface as recited in claim 22, the user interface performing a further step comprising indicating to the user whether scrolling is possible in vertical directions.

33. A computer-readable storage medium containing instructions for performing steps comprising:

displaying visual content on a viewing area, wherein the visual content has a content area that is larger than the viewing area, the visual content including a plurality of selectable objects;

placing a focus on a first one of the objects;

detecting activation of a user-manipulated operator in a selected direction;

determining a speed value from the activation of the user-manipulated operator;

if there is a second one of the objects within a predefined linear distance in the content area from the first object in approximately the selected direction and the speed value exceeds a first threshold, tabbing the focus to said second object;

if there is not a second one of the objects within the predefined linear distance in the content area from the first object in approximately the selected direction and the speed value does not exceed the first threshold, scrolling the visual content relative to the viewing area.

34. A computer-readable storage medium as recited in claim 33, wherein the tabbing step includes a step of scrolling the visual content relative to the viewing area if necessary to bring the second one of the objects onto the viewing area.

35. A computer-readable storage medium as recited in claim 33, the steps further comprising a step of removing the focus during the scrolling step.

36. A computer-readable storage medium as recited in claim 33, wherein the second one of the objects includes a continuous image having a plurality of selectable areas, the steps further comprising:

displaying a pointer over the continuous image;

moving the pointer smoothly over the continuous image in response to directional activation of the user-manipulated operator.

37. A computer-readable storage medium as recited in claim 33, wherein the second one of the objects includes a continuous image having a plurality of selectable areas, the steps further comprising:

displaying a pointer over the continuous image;

moving the pointer smoothly over the continuous image in response to directional activation of the user-manipulated operator;

when the pointer moves off of the continuous image, removing the pointer and either tabbing the focus or scrolling the visual content depending on the proximity of other objects in the content area.

38. A computer-readable storage medium as recited in claim 33, the steps further comprising:

determining a speed value from the activation of the user-manipulated operator;

performing the tabbing step only if the speed value exceeds a threshold;

if the speed value does not exceed the threshold, scrolling the visual content relative to the viewing area.

39. A computer-readable storage medium containing instructions for performing steps comprising:

displaying visual content on a viewing area, wherein the visual content has a content area that is larger than the viewing area, the visual content including a plurality of selectable objects;

placing a focus on a first one of the objects;

detecting activation of a user-manipulated operator in a selected direction;

determining a speed value from the activation of the user-manipulated operator;

if there is a second one of the objects within a predefined linear distance in the content area from the first object in approximately the selected direction and the speed value does not exceed a threshold, tabbing the focus to said second object;

if there is not a second one of the objects within the predefined linear distance in the content area from the first object in approximately the selected direction and the speed value exceeds the threshold, scrolling the visual content relative to the viewing area.

40. A computer-readable storage medium as recited in claim 33, the steps further comprising:

performing the tabbing step only if the speed value does not exceed a second threshold;

if the speed value does not exceed the first threshold or does exceed the second threshold, scrolling the visual content relative to the viewing area without tabbing to consecutive objects.

41. A computer-readable storage medium as recited in claim 33, wherein the selectable objects include hypertext links.

42. A computer-readable storage medium as recited in claim 33, the steps further comprising a step of displaying scroll indicators showing whether scrolling is possible in vertical directions.

43. A computer-readable storage medium as recited in claim 33, further comprising a step of indicating to the user whether scrolling is possible in vertical directions.

* * * * *

UNITED STATES PATENT AND TRADEMARK OFFICE
CERTIFICATE OF CORRECTION

PATENT NO.    : 6,154,205
DATED         : November 28, 2000
INVENTOR(S)   : Josh Carroll et al.

Page 1 of 1

It is certified that error appears in the above-identified patent and that said Letters Patent is hereby corrected as shown below:

Column 2,
Line 2, change "modem" to -- modern --.

Column 4,
Line 9, add -- or -- after "hyperlinks".

Column 13,
Line 26, change "use" to -- user --.

Signed and Sealed this

Tenth Day of June, 2003

JAMES E. ROGAN
*Director of the United States Patent and Trademark Office*